(12) United States Patent
Cozzens et al.

(10) Patent No.: US 11,391,152 B2
(45) Date of Patent: *Jul. 19, 2022

(54) TUNNEL WATERPROOFING COMPOSITION AND SYSTEM

(71) Applicant: GCP Applied Technologies Inc., Cambridge, MA (US)

(72) Inventors: David Cozzens, Dracut, MA (US); Xia Cao, Acton, MA (US); Steven Horton, Manchester (GB); Rachel C. Weston, Halifax (GB); Abbas Kazmi, Manchester (GB)

(73) Assignee: GCP Applied Technologies Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,066

(22) Filed: Apr. 27, 2021

(65) Prior Publication Data

US 2021/0246786 A1 Aug. 12, 2021

Related U.S. Application Data

(63) Continuation of application No. 16/732,297, filed on Dec. 31, 2019, now Pat. No. 11,242,751.

(Continued)

(51) Int. Cl.
*E21D 11/38* (2006.01)
*E21D 11/10* (2006.01)
*C09D 133/04* (2006.01)

(52) U.S. Cl.
CPC ............ *E21D 11/38* (2013.01); *C09D 133/04* (2013.01); *E21D 11/10* (2013.01)

(58) Field of Classification Search
CPC .............................. E21D 11/38; E02D 29/045

(Continued)

(56) References Cited

U.S. PATENT DOCUMENTS

| 3,720,538 A * | 3/1973 | Bergmeister | ........ C08L 2666/02 |
| | | | 427/379 |
| 6,521,718 B2 * | 2/2003 | Goeb | ................. C08G 18/3821 |
| | | | 427/137 |

(Continued)

FOREIGN PATENT DOCUMENTS

| CN | 108300046 A * | 7/2018 | ............. B32B 27/34 |
| DE | 3343212 A1 * | 6/1985 | ............. C08G 18/08 |
| EP | 2735595 A1 * | 5/2014 | ............. B32B 27/34 |

*Primary Examiner* — Frederick L Lagman
(74) *Attorney, Agent, or Firm* — Nilay J. Choksi; Joseph D. Rossi (57) ABSTRACT

Disclosed are methods, compositions, and composition packages for spray-coating a membrane for waterproofing a concrete tunnel applications. After primer coating is applied onto a surface in the tunnel, the coating composition is sprayed to form a membrane, and then concrete is cast or sprayed against the membrane so that it can bond to the membrane. Coating compositions comprise two or more acrylate monomers, as well as initiator, accelerator, and optional additive. Preferably, the coating composition is established by using a two-part package, one part having initiator, the other part having accelerator, and each part containing the monomers and optional additives so that the two parts can be shipped to the application site and mixed in a 1:1 ratio during spraying. The waterproofing coating composition provides excellent bonding with concrete.

21 Claims, 2 Drawing Sheets

Related U.S. Application Data

(60) Provisional application No. 62/891,657, filed on Aug. 26, 2019, provisional application No. 62/787,987, filed on Jan. 3, 2019.

(58) Field of Classification Search
USPC ........... 405/150.1, 150.2, 270; 524/277, 474, 524/517, 521, 522, 523, 525, 548, 553, 524/555, 556, 558, 560, 561; 523/122
See application file for complete search history.

(56) References Cited

U.S. PATENT DOCUMENTS

| | | | |
|---|---|---|---|
| 6,793,441 B2* | 9/2004 | Shimizu | E21D 11/105 405/146 |
| 6,908,672 B2* | 6/2005 | Wenninger | C09J 7/38 428/356 |
| 8,835,553 B2* | 9/2014 | Takeda | C09D 133/06 524/565 |
| 2004/0087695 A1* | 5/2004 | Sugimoto | D06M 15/3562 524/386 |
| 2004/0127631 A1* | 7/2004 | Kanamori | C09K 3/1018 524/523 |
| 2007/0037925 A1* | 2/2007 | Weitzel | C04B 28/02 524/563 |
| 2012/0094115 A1* | 4/2012 | Takeda | C09D 133/06 428/339 |
| 2017/0081807 A1* | 3/2017 | Tetrault | E01C 13/02 |

* cited by examiner

TUNNEL WATERPROOFING COMPOSITION AND SYSTEM

CROSS-REFERENCE TO RELATED APPLICATIONS

This continuation application is based on and claims priority to U.S. application Ser. No. 16/732,297, filed Dec. 31, 2019 and allowed; which in turn claims priority to U.S. Provisional Application No. 62/787,987, entitled "Tunnel Waterproofing Composition and System," filed Jan. 3, 2019; and to U.S. Provisional Application No. 62/891,657, entitled "Tunnel Waterproofing Composition and System," filed Aug. 26, 2019, both of which are incorporated herein by reference.

FIELD OF THE INVENTION

The invention relates to the field of waterproofing civil engineering structures, and more particularly to a waterproofing composition for use in tunnel linings and to a method for constructing tunnels.

BACKGROUND OF THE INVENTION

Tunnels are typically waterproofed using one of two methods. In the first method, a sheet membrane can be applied onto a tunnel wall using adhesive, mechanical attachment, or heat welding. In the second method, the membrane can be coated onto the tunnel wall using a liquid-applicable system that cures over time.

A "sandwich" structure is typically achieved having a first concrete layer, the waterproofing membrane, and a second concrete lining that is formed against the membrane. Although casting the second concrete lining is still widely done for establishing the final tunnel wall layer over the membrane, spray application of the secondary concrete lining is quickly gaining interest as a fast and low installed cost option, especially as robotic spraying becomes reliable.

While spray application of concrete linings entails about half the cost of casting the concrete lining and requires much shorter time, the ability to spray concrete as the final concrete lining layer is of tremendous interest in terms of cost and time savings, if other performance criteria are met.

The present inventors believe that spray-application of the second concrete lining could become a common practice if the waterproofing membrane were improved in terms of robustness under shotcrete application and achieving better adhesion properties between the sprayed concrete and the waterproofing membrane.

Sheet waterproofing membranes, in general, have relatively low material costs. However, surface geometries and irregularities often pose difficulties in the application of sheet membranes. The overlaps or intersections of adjacent membrane sheets must be heat-welded or sealed with adhesive, or otherwise are susceptible to water leakage if overlap joints between membranes are weak or poorly sealed. Attachment of the membrane on the first concrete lining with minimum penetration through the membrane is important but has been a challenge in the art.

An example of tunnel waterproofing is PCT Patent Appl. Pub. No. WO2018/122113A1, which details a sheet construction comprising two layers for adequate adhesion to the both first concrete layer and the secondary concrete layer. Liquid applied coatings are taught for providing seamless and fully adhered cured membranes. Another example U.S. Pat. No. 6,489,032 discloses a cementitious latex sprayed material for use in waterproofing tunnel constructions. A disadvantage to this material is that water-based coatings cure over several hours to days by water evaporation or cement hydration, resulting in long process times. Another example U.S. Pat. No. 6,767,164 discloses a rubber emulsion sprayed system that cures to a rubber coating by ambient temperature vulcanization. However, these vulcanized systems purportedly exhibit low tensile strengths and long cure times.

Reactive systems, such as those based on polyurethane or polyurea, including those having 100% solids, can cure rapidly. However, such compositions can contain flammable (low flash point) or toxic components, or produce unpleasant odors, and are inappropriate for use in confined spaces, such as tunnels and mines.

A reactive liquid waterproofing system for concrete structures has been commercially available from Stirling Lloyd Polychem Ltd., now a part of GCP Applied Technologies Inc., under the brand name INTEGRITANK® HF. It has been used in areas with open ventilation, so flammability and odor can be managed. However, such flammability and odor likely would be unacceptable in more confined spaces, such as tunnels and mines.

While prior approaches offer variety for waterproofing situations, what is needed is a novel membrane coating technology for improved application convenience and for ensuring performance, especially in tunnel waterproofing situations. However, in view of the art considered as a whole at the time the present invention was made, it was not obvious to those of ordinary skill in the field of this invention how the shortcomings of the prior art could be overcome. While certain aspects of conventional technologies have been discussed to facilitate disclosure of the invention, Applicants in no way disclaim these technical aspects, and it is contemplated that the claimed invention may encompass one or more of the conventional technical aspects discussed herein, especially in combination with the innovative aspects described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved composition, system package, and method for waterproofing concrete tunnel linings is now met by a new, useful, and nonobvious invention.

An exemplary embodiment of the present invention is a 100% solids reactive liquid coating system comprising a liquid composition with high flashpoint and low odor that can be spray-applied in confined spaces over a range of temperatures to rapidly cure to a seamless waterproofing coating that exhibits high mechanical strength, robustness to withstand the force of cast or sprayed concrete application, and strong adhesion to the substrate along one surface and to cast or sprayed concrete along an opposing surface. The 100% solids reactive liquid coating system results in minimal volatile organic chemical (VOC) exposure, yet still achieves a fully cured tack-free surface in less than one hour. An exemplary embodiment exhibits viscosity such that it can be "cold" sprayed without additional heating apparatus over a range of temperatures experienced in tunnel or mining applications.

An exemplary method of the present invention for waterproofing a tunnel surface, comprises:
(A) providing an interior substrate or surface of a tunnel;
(B) optionally applying a primer coating onto the tunnel interior substrate or surface;
(C) spray-coating on the primer coating a waterproofing coating composition comprising the following components:
  (i) a first monomer comprising a di-functional (meth) acrylate in the amount of about 5% to about 55% based on total weight of the waterproofing coating composition, and having the structure, $(H_2C=C(R^1)COOR^2)_2-R^3$, wherein $R^1$ represents a hydrogen atom or a methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof;
  (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$;
  (iii) an initiator in the amount of about 0.1% to about 5% based on total weight of the waterproofing coating composition;
  (iv) an accelerator in the amount of about 0.1% to about 2% based on total weight of the waterproofing coating composition; and
  (v) at least one additive (e.g., filler material, biocide, wax, UV absorbent, stabilizer or reaction inhibitor, pigment, rheology modifying agent, abrasion resistance enhancing additive, or mixture of any of the foregoing) in the amount 0% to about 50% based on total weight of the waterproofing coating composition; and
(D) allowing the applied waterproofing coating composition to harden upon the primer coating to form a waterproof layer.

An exemplary composition package of the present invention for establishing a waterproof coating layer upon an interior substrate or surface within a tunnel, comprising:
  (i) a first monomer comprising a di-functional (meth) acrylate in the amount of about 5% to about 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof;
  (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$;
  (iii) an initiator in the amount of about 0.1% to about 5% based on total weight of the waterproofing coating composition;
  (iv) an accelerator in the amount of about 0.1% to about 2% based on total weight of the waterproofing coating composition; and
  (v) at least one additive (e.g., filler material, biocide, wax, UV absorbent, stabilizer or reaction inhibitor, etc.) in the amount 0% to about 50% based on total weight of the waterproofing coating composition; and wherein the composition package comprises a first part containing the initiator and a second part containing the accelerator, wherein the monomers and the at least one additive may be contained within the first part alone, within the second part alone, or within both the first part and the second part.

The first and second parts of the exemplary composition package are preferably shipped (in separate containers or packages) to the installation or job site, where they are combined (such as by spraying through a single nozzle where they are conveniently mixed together), and applied onto the tunnel wall lining or other substrate to form a coating layer, after which the coating layer begins to harden and form a waterproofing membrane.

The invention thus also provides a waterproofing coating composition and membrane layer which comprise components (i), (ii), (iii), (iv), and (v) in the relative amount ranges as described above.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
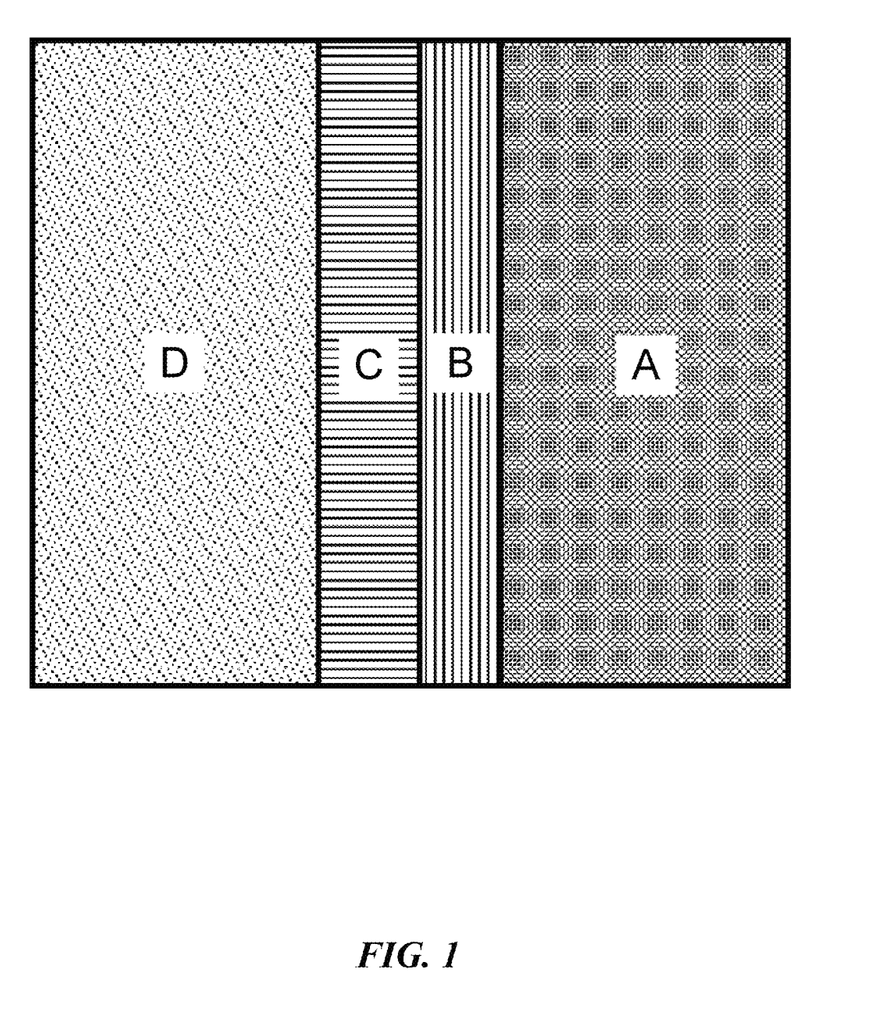
FIG. 1 is a schematic illustrative diagram of an exemplary tunnel waterproofing construction comprising a primary concrete layer concrete as a substrate (A), a primer coating (B), a liquid-sprayed waterproofing coating composition membrane (C), and a secondary concrete layer (D) disposed in outer or overlying relation to the waterproofing coating composition membrane (C).
Figure 2:
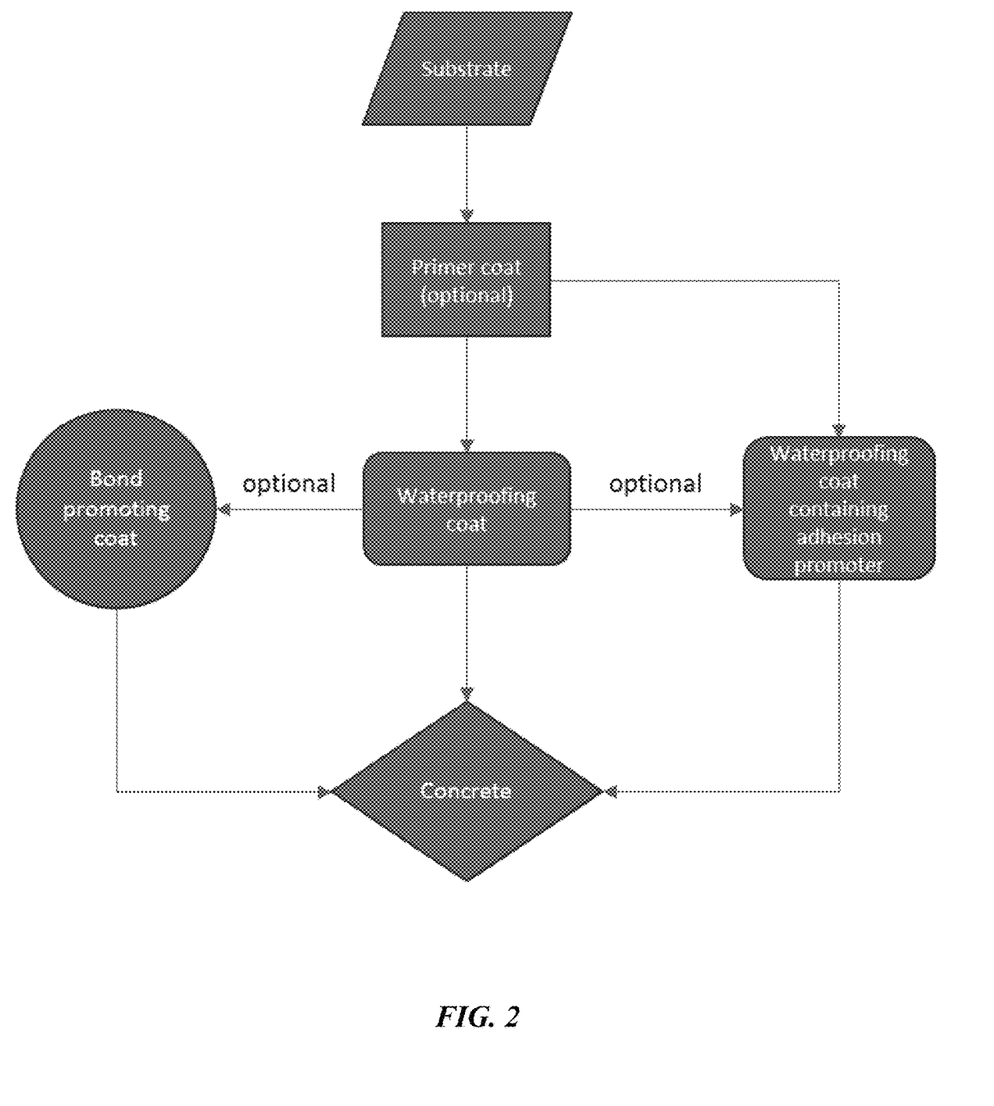
FIG. 2 is a flow diagram depicting a method of waterproofing a tunnel, according to an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Various exemplary embodiments and aspects of the invention will be particularly described below as illustrations of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

It is an object of the current invention to achieve a high flash point, along with relatively low to no odor and toxicity, within a 100% solids reactive liquid coating system. It is a further object of the current invention to provide waterproofing composition that is able to cure fully to a solid both throughout and on its surface in less than about (1) hour, contrary to existing water-based liquid coatings. This provides commercial and labor advantages in shortening application time.

In a first example embodiment, the invention provides a method for waterproofing a tunnel surface, comprising:
(A) providing an interior substrate or surface of a tunnel;
(B) optionally applying a primer coating onto the tunnel interior substrate or surface;
(C) spray-coating onto the primer coating a waterproofing coating composition comprising:
   (i) a first monomer comprising a di-functional (meth)acrylate in the amount of about 5% to about 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof;
   (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$;
   (iii) an initiator in the amount of about 0.1% to about 5% based on total weight of the waterproofing coating composition;
   (iv) an accelerator in the amount of about 0.1% to about 2% based on total weight of the waterproofing coating composition; and
   (v) at least one additive chosen from filler material, biocide, wax, UV absorbent, stabilizer or reaction inhibitor, pigment, rheology modifying agent, abrasion resistance enhancing additive, or mixture thereof, said at least one additive being present in the amount 0% to 50% based on total weight of the waterproofing coating composition; and
(D) allowing the waterproofing coating composition to harden upon the primer coating to form a waterproof layer.

As used herein, the term "spray-coating" means establishing a coating layer onto a substrate, such as a concrete liner, a composition that hardens into a membrane. The spray-coating is preferably done by spraying two parts of the composition which are blended within the spray-nozzle or piping or tubing or other conduit which feeds coating composition components from storage containers or tanks to the spray nozzle. The use of two-component systems in spray applications is known in the art.

By "hardened", those having skill in the waterproofing of tunnels will understand that the waterproof layer should be dry to hand touch and should not displace (in the manner of a liquid) when concrete is spray-applied onto the waterproof layer. Typically, when waterproofing courses are established in tunnel environments, there will be testing to ascertain the absence of leak points, and this would be expected to take longer than the time during which the spray-applied waterproofing coating composition would require curing to the point at which a concrete lining could be cast or spray-applied against it.

In a first aspect of the first example embodiment, the first monomer (component "i") is present in the waterproofing coating composition; preferably, it is used in the amount of about 10%-45%; and, more preferably in the amount of about 15%-35% (all percentages herein regarding components are based on weight of the waterproofing coating composition).

In a second aspect of the first example embodiment, the second monomer (component "ii") is present in the waterproofing coating composition; preferably, it is used in the amount of about 15%-50%; and, more preferably in the amount of about 25%-35%.

In a third aspect of the first example embodiment, the at least one additive is present in the amount of about 10%-40%, and, more preferably, it is present in the amount of about 15%-35%. The at least one additive is preferably chosen from a wax, calcium carbonate, fumed silica, pigment, and mixtures thereof.

In a second example embodiment, which may be based on the first example embodiment above, the method further comprises applying onto the waterproof layer, which was spray-applied onto the primer coating layer, a hydratable cementitious layer.

In a first aspect of this second example embodiment, the hydratable cementitious layer is concrete, which is spray-applied onto the waterproof layer after it is hardened.

In a third example embodiment, which may be based on any of the first through second example embodiments above, the waterproofing coating composition, which is spray-applied onto the primer coating, further comprises a third monomer having the structure, $H_2C=C(R^1)COOR^2$, as set forth in subsection "ii" above, and this third monomer has a $T_g$ that is at least about 30° C. lower than the $T_g$ of the second monomer; and this third monomer is present in the waterproofing coating composition in the amount of about 5%-60% based on total weight of the waterproofing coating composition. More preferably, the third monomer is present in the amount of about 10%-45%; and, most preferably, the third monomer is present in the amount of about 15%-35%, based on total weight of the waterproofing coating composition.

In a fourth example embodiment, which may be based on any of the first through third example embodiments above, the waterproofing coating composition is applied as a two-part system, wherein the first part comprises at least one of the monomers and the initiator, and the second part comprises at least one of the monomers and the accelerator.

In a first aspect of the fourth example embodiment, each of the first part and the second part comprises the same monomers and at least one additive, and the first part contains the initiator and the second part contains the accelerator. This configuration is preferred as it permits the first and second parts to be used in a 1:1 ratio that is particularly convenient for spray-application, where the two parts can be pumped through a static mixer and sprayed through a single nozzle.

In a fifth example embodiment, which may be based on any of the first through fourth example embodiments above, the monomer components of the waterproofing coating composition have flash points of at least 75° C. or higher. More preferably, monomer components of the waterproofing composition have flash points of at least 85° C. or higher; and, most preferably, monomer components of the waterproofing composition have flash points of at least 95° C. or higher.

In a sixth example embodiment, which may be based on any of the first through fifth example embodiments above, the initiator in the waterproofing coating composition is chosen from alkyl or aryl peroxides, or inorganic salts. A preferred initiator is benzoyl peroxide.

In a seventh example embodiment, which may be based on any of the first through sixth example embodiments above, the accelerator is chosen from an alkyl amine, an aryl amine, or a mixture thereof. A preferred accelerator is a tertiary amine.

In an eighth example embodiment, which may be based on any of the first through seventh example embodiments above, the waterproofing coating composition comprises at least two additives chosen from a wax, a rheology-modifying agent (e.g., fumed silica, colloidal silica, a copolymer such as poly(ethylene oxide-co-propylene oxide)), a pigment (e.g., titanium dioxide, iron oxides, phthalocyanines), an abrasion resistance-enhancing additive (e.g., calcium carbonate, barium sulfate), or a mixture thereof. The at least two additives are present collectively in the amount of about 5%-35%, and more preferably in the amount of about 10%-25%, based on total weight of the waterproofing coating composition.

In a ninth example embodiment, which may be based on any of the first through eighth example embodiments above, the waterproofing coating composition further comprises an adhesion promoter in the amount of about 1%-20% based on total weight of the waterproofing coating composition.

In a first aspect of the ninth example embodiment, the adhesion promoter is chosen from acrylic, natural rubber, polyisoprene, polybutadiene, butyl rubber, styrene-butadiene rubber (SBR) including carboxylated styrene-butadiene rubber (xSBR), styrene-acrylic rubber, ethylene-propylene-diene (EPDM) rubber, poly(vinyl acetate), and ethylene-vinyl acetate.

In a second aspect of the ninth example embodiment, which may be based on any of the first through tenth example embodiments above, the adhesion promoter is in dispersed form within a latex or aqueous suspension.

In a tenth example embodiment, which may be based on any of the first through ninth example embodiments above, the method further comprises applying onto the cured waterproofing coating composition, which was spray-applied onto the primer coating layer, a bond promoting coating composition.

In a first aspect of the tenth example embodiment, the bond promoting coating composition comprises one or more of a water- or solvent-based coating, pressure sensitive adhesive, hot melt adhesive, and the like.

In an eleventh example embodiment, which may be based on any of the first through tenth example embodiments above, the waterproofing coating composition has a viscosity of less than 3 Pa·s as measured using parallel plate rheometry with a 500 micron gap at 1000 s$^{-1}$ and 5° C.

As used herein, the term "viscosity" refers to a measure of a fluid's resistance to deformation at a given rate. A liquid with a lower viscosity flows more freely/readily than a liquid with a higher viscosity. Viscosity is typically recorded as centipoise (cps) or Pascal-seconds (Pa·s). The viscosity of a liquid may be determined by methods known in the art. Within the context of the present disclosure, viscosity measurements are acquired according to parallel plate rheometry with a 500 micron gap at 1000 s$^{-1}$ and 5° C., unless otherwise stated. Preferably, the liquid composition taught by the present disclosure has a viscosity of about 5 Pa·s or less, 4 Pa·s or less, 3 Pa·s or less, 2 Pa·s or less, 1 Pa·s or less, 0.9 Pa·s or less, 0.8 Pa·s or less, 0.7 Pa·s or less, 0.6 Pa·s or less, 0.5 Pa·s or less, 0.4 Pa·s or less, and 0.3 Pa·s or less, or in a range between any two of these values.

In a twelfth example embodiment, which may be based on any of the first through eleventh example embodiments above, the waterproofing coating composition, after polymerization of the monomer components after the waterproofing coating composition is spray-applied onto the primer coating, is cured and tack free (to the touch of human hand) less than one hour after application at 5-30° C., in accordance with ASTM D1640/D1640M-14 (2018).

In a thirteenth example embodiment, which may be based on any of the first through twelfth example embodiments above, the waterproofing composition coating, after curing, has a tensile bond strength with respect to concrete sprayed or cast against it of greater than 0.1 MPa in accordance with ASTM C1583/C1583M-13 (2013). More preferably, the bond strength is greater than 0.25 MPa; and, most preferably, greater than 0.5 MPa.

As used herein, the terms "tensile bond strength" and "tensile adhesion" refer to the resistance of two materials adhered to each other, to tension or pulling forces. These strengths are specifically measured as the amount of load/force per unit area resisting the load/force. It is typically recorded as pounds per square inch (psi) or megapascals (MPa). Tensile bond strength or tensile adhesion may be determined by methods known in the art. Within the context of the present disclosure, tensile bond strength or tensile adhesion are acquired according to ASTM C1583/C1583M-13 (2013), unless otherwise stated. In certain embodiments, laminates of the present disclosure have a tensile bond strength or tensile adhesion of about 0.1 MPa or more, about 0.2 MPa or more, about 0.3 MPa or more, about 0.4 MPa or more, about 0.5 MPa or more, about 0.6 MPa or more, 0.7 MPa or more, 0.8 MPa or more, 0.9 MPa or more, or in a range between any two of these values. In preferred embodiments, tensile adhesion is about 0.5 MPa or more.

In a fourteenth example embodiment, the invention provides a tunnel waterproofing made in accordance with the method of any of the first through thirteenth example methods above.

In a fifteenth example embodiment, which may be based on any of the first through fourteenth example embodiments above, the invention provides a composition package for establishing a waterproof coating layer upon or along an interior substrate or surface within a tunnel, the package comprising:
  (i) a first monomer comprising a di-functional (meth) acrylate in the amount of about 5% to about 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof;
  (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$;
  (iii) an initiator in the amount of about 0.1% to about 5% based on total weight of the waterproofing coating composition;
  (iv) an accelerator in the amount of about 0.1% to about 2% based on total weight of the waterproofing coating composition; and
  (v) at least one additive in the amount 0% to about 50% based on total weight of the waterproofing coating composition; and
wherein the package comprises a first part containing the initiator and a second part containing the accelerator, wherein the monomers and the at least one additive may be contained within the first part alone, within the second part alone, or within both the first part and the second part.

In a sixteenth example embodiment, which may be based on the fifteenth example embodiment above, the first part and second part each comprise the first monomer (i), the second monomer (ii), and the least one additive (v), thereby enabling the first part and second part to be combined at the application jobsite in a 1:1 ratio during spray-application of the waterproofing coating composition.

In an seventeenth example embodiment, which may be based on or incorporated any of the foregoing example embodiments described above, the invention provides a waterproofing coating composition and waterproofing membrane layer, comprising:
  (i) a first monomer comprising a di-functional (meth) acrylate in the amount of about 5% to about 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof;
  (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$;
  (iii) an initiator in the amount of about 0.1% to about 5% based on total weight of the waterproofing coating composition;
  (iv) an accelerator in the amount of about 0.1% to about 2% based on total weight of the waterproofing coating composition; and
  (v) at least one additive in the amount 0% to about 50% based on total weight of the waterproofing coating composition.

In an eighteenth example embodiment, the invention provides a tunnel lining construction which can be based upon, or made by, any of the first through seventeenth example embodiments described above.

In a further example embodiment which may be based on any of the foregoing example embodiments, the waterproofing coating composition comprises:
  (i) a first monomer comprising a di-functional (meth) acrylate in the amount of about 5% to about 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof; wherein examples of the first monomer include the urethane reaction product of a hydroxyl-functional (meth)acrylate and isocyanate functional oligomer or esterification reaction product of a hydroxyl-functional (meth)acrylate and carboxylic acid functional oligomer; wherein the isocyanate-functional oligomer can be prepared from reaction of aliphatic or aromatic isocyanates with hydroxyl-functional oligomers; wherein examples of the hydroxyl-functional (meth) acrylate include hydroxyethyl methacrylate, hydroxypropyl methacrylate, and the like; wherein examples of the isocyanate include isophorone diisocyanate, 1,6-hexamethylenediisocyanate, 2,2,4-trimethyl-hexamethylenediisocyanate, 4,4'-methylenebis(cyclohexylisocyanate), toluenediisocyanate, 4,4'-methylenediphenyldiisocyanate, and the like; and wherein examples of the hydroxyl-functional or carboxylic acid functional oligomers include polyethylene glycol, polypropylene glycol, polytetramethylene ether glycol; poly(ethylene adipate), poly(butylene adipate), polycaprolactone, polybutadiene, polysiloxane, or the like, of varying molecular weights (and preferred is an oligomeric dimethacrylate with $T_g$ less than $-20°$ C. in the range of about 15% to about 35% based on total weight of the waterproofing coating composition);
  (ii) a second monomer in the amount of about 5% to about 65% based on total weight of the waterproofing coating composition and having the structure, $H_2C=C(R^1)COOR^2$, wherein $R^1$ represents hydrogen atom or methyl group; and $R^2$ represents linear or branched alkyl, hydroxyalkyl, aryl, alicyclic, polycyclic, heterocyclic, or heteroaromatic group from $C_2$ to $C_{18}$; examples of the second monomer include benzyl methacrylate, isobornyl methacrylate, tetrahydrofurfuryl methacryate, isophoryl methacrylate, cyclohexyl methacrylate, hydroxyethyl methacrylate, hydroxypropyl methacrylate and the like (wherein the preferred range is about 25% to about 35% based on total weight of the waterproofing coating composition);

(iii) a third monomer in the range of about 5% to about 60% based on total weight of the waterproofing coating composition and having the structure, $H_2C\!=\!C(R^1)COOR^2$, as set forth in subsection "ii"; and said third monomer has a $T_g$ that is at least about 30° C. lower than $T_g$ of the second monomer; examples of the third monomer include n-butyl methacrylate, 2-phenoxyethyl methacrylate, ethyltriglycol methacrylate, dodecyl methacrylate, and the like (wherein the preferred amount is about 15% to about 35% based on total weight of the waterproofing coating composition);

(iv) an initiator in the amount of about 0.1% to about 5% based on total weight of the waterproofing coating composition; preferred is benzoyl peroxide in the amount of about 0.5% to about 3% based on total weight of the waterproofing coating composition;

(v) an accelerator in the amount of about 0.1% to about 2% based on total weight of the waterproofing coating composition; preferred is a tertiary amine used in the amount of about 0.2% to about 0.6% based on total weight of the waterproofing coating composition; and (vi) at least one additive in the amount 0% to about 50% based on total weight of the waterproofing coating composition; preferred additives include a wax in the amount of about 0.1% to about 1%, calcium carbonate in the amount of about 10% to about 30%, and fumed silica in the amount of about 0.5% to about 4%, all percentages herein based on total weight of the waterproofing coating composition.

In a further preferred example embodiment, the invention provides a two-part system. The first part comprises monomer (i) in the amount of about 15% to about 35%, monomer (ii) in the amount of about 25% to about 35%, monomer (iii) in the amount of about 15% to about 35%, a wax in the amount of about 0.1% to about 1%, calcium carbonate in the amount of about 10% to about 30%, fumed silica in the amount of about 0.5% to about 4%, and a tertiary amine accelerator in the amount of about 0.4% to about 1.2%, all percentages based on the total weight of the first part of the liquid applied waterproofing coating composition. The second part comprises monomer (i) in the amount of about 15% to about 35%, monomer (ii) in the amount of about 25% to about 35%, monomer (iii) in the amount of about 15% to about 35%, a wax in the amount of about 0.1% to about 1%, calcium carbonate in the amount of about 10% to about 30%, fumed silica in the amount of about 0.5% to about 4%, and a benzoyl peroxide initiator in the amount of about 1% to about 6%, all percentages based on the total weight of the second part of the liquid applied waterproofing coating composition. The mixture of the first and second parts by equal volume comprise the liquid-applied waterproofing coating composition.

In another preferred embodiment, a waterproofing coating composition and coating layer comprises the following components:

(i) a first monomer comprising a di-functional (meth)acrylate as described above in the amount of about 5% to about 55% based on total weight of the waterproofing coating composition (and more preferably in the amount of about 15% to about 35% based on total weight of the waterproofing coating composition);

(ii) a second monomer as described above, in the amount of about 5% to about 65% based on total weight of the waterproofing coating composition (preferred in the amount of about 25% to about 35% based on total weight of the waterproofing coating composition);

(iii) a third monomer as described above, in the amount of about 5% to about 60% based on total weight of the waterproofing coating composition (preferred in the amount of about 15% to about 35% based on total weight of the waterproofing coating composition);

(iv) an initiator in the amount of about 0.1% to about 5% based on total weight of the waterproofing coating composition (preferred is benzoyl peroxide in the amount of about 0.5% to about 3% based on total weight of the waterproofing coating composition);

(v) an accelerator in the amount of about 0.1% to about 2% based on total weight of the waterproofing coating composition (preferred is tertiary amine in the amount of about 0.2% to about 0.6% based on total weight of the waterproofing coating composition); and (vi) at least one additive in the amount 0% to about 50% based on total weight of the waterproofing coating composition (a preferred additive is a wax in the amount of about 0.1% to about 1%, calcium carbonate in the amount of about 10% to about 30%, and fumed silica in the amount of about 0.5% to about 4%, based on total weight of the waterproofing coating composition); and (vii) an adhesion promoter in the amount of about 1% to about 20% based on total weight of the waterproofing coating composition, wherein the adhesion promoter is chosen from acrylic, natural rubber, polyisoprene, polybutadiene, butyl rubber, styrene-butadiene rubber (SBR) including carboxylated styrene-butadiene rubber (xSBR), styrene-acrylic rubber, ethylene-propylene-diene (EPDM) rubber, poly(vinyl acetate), and ethylene-vinyl acetate (and most preferred are polymers used in dispersed form, such as latex or aqueous suspension, in the amount of about 5% to about 15% based on total weight of the waterproofing coating composition).

Where a latex suspension was utilized as adhesion promoter and incorporated into a 100% solids reactive liquid coating, an unexpected and impressive formation of a monolithic membrane was observed, while imparting improved tensile adhesion of concrete cast against the cured membrane.

In further exemplary embodiments, the invention provides a composition package having first and second parts, wherein the first part contains the accelerator, and the second part contains the initiator, and the first and second parts both comprise the first, second, and third monomers and the at least one additive, whereby the first and second parts can be combined in a 1:1 ratio during spray-application onto a tunnel lining or other substrate.

In yet another exemplary embodiment, the waterproofing coating composition further comprises a bond promoting coating composition disposed onto or along the cured waterproofing layer. The bond promoting composition comprises one or more of a water- or solvent-based coating, pressure sensitive adhesive, hot melt adhesive, and the like. Examples of such bond promoting compositions include, but are not limited to, acrylic, natural rubber, polyisoprene, polybutadiene, butyl rubber, styrene-butadiene rubber (including carboxylated styrene-butadiene rubber), styrene-acrylic rubber, ethylene-propylene-diene (EPDM) rubber, poly(vinyl acetate), and ethylene-vinyl acetate (and most preferred are polymers used in dispersed form, such as latex or aqueous suspension). The function of the bond promoting coating composition is to enhance or improve adhesion between the cured waterproofing membrane and the concrete layer cast or sprayed thereon. In an exemplary method of the present invention, the bond promoting composition is applied onto or along the hardened waterproofing coating.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXEMPLIFICATIONS

Example 1

An exemplary liquid waterproofing composition was prepared by first making a solution of prescribed amounts of two different methacrylate monomers—a hard monomer with $T_g$>ambient temperature, and a soft monomer with $T_g$<ambient temperature—and an oligomeric dimethacrylate (with $T_g$<−20° C.), followed by dispersing prescribed amounts of a wax, fumed silica, and calcium carbonate into the solution to achieve a homogeneous mixture. The liquid composition exhibited a viscosity of about 0.314 Pa·s measured using parallel plate rheometry with a 500 micron gap at 1000 s$^{-1}$ and 10° C. Prescribed amounts of benzoyl peroxide (initiator) and then a tertiary amine (accelerator) were added sequentially to the mixture to initiate the working time of the liquid coating.

An approximately 1.5-mm thick membrane was cast on a release liner at ambient temperature and humidity. Full surface and through cure was achieved in less than one (1) hour, in accordance with ASTM D1640. After the membrane was fully cured, concrete was cast against the air-facing surface of the membrane. About seven (7) days after concrete casting, tensile adhesion between the membrane and the concrete cast thereon was tested according to ASTM C1583 with an average value of about 0.60 MPa and standard deviation of about 0.16 MPa. It should be noted that this tensile adhesion value is between the membrane and the secondary concrete lining in overlying relation to the membrane, whereas the conventional art typically measures tensile adhesion between the membrane and the primary concrete lining in underlying relation to the membrane.

Example 2

An exemplary liquid waterproofing composition was prepared by first making a solution of prescribed amounts of two different methacrylate monomers—a hard monomer with $T_g$>ambient temperature, and a soft monomer with $T_g$<ambient temperature—an oligomeric dimethacrylate (with $T_g$<−20° C.), and a liquid rubber latex (adhesion promoter), followed by dispersing prescribed amounts of a wax, fumed silica, and calcium carbonate into the solution to achieve a homogeneous mixture. The liquid composition exhibited a viscosity of about 1.801 Pas measured using parallel plate rheometry with a 500 micron gap at 1000 s$^{-1}$ and 10° C. Prescribed amounts of benzoyl peroxide (initiator) and then two different tertiary amines (accelerators) were added sequentially to the mixture to initiate the working time of the liquid coating.

An approximately 1.5-mm thick membrane was cast on a release liner at ambient temperature and humidity. Full surface and through cure was achieved in less than one (1) hour. After the membrane was fully cured, concrete was cast against the air-facing surface of the membrane. About fourteen (14) days after concrete casting, tensile adhesion between the membrane and the concrete cast thereon was tested according to ASTM C1583 with an average value of about 0.90 MPa and standard deviation of about 0.19 MPa.

Example 3

An exemplary liquid waterproofing composition was prepared by making two separate solutions of prescribed amounts of two different methacrylate monomers—a hard monomer with $T_g$>ambient temperature, and a soft monomer with $T_g$<ambient temperature—and an oligomeric dimethacrylate (with $T_g$<−20° C.), followed by dispersing prescribed amounts of a wax, fumed silica, and calcium carbonate to achieve homogeneous mixtures. Prescribed amounts of benzoyl peroxide (initiator) was added to one of the mixtures, and a tertiary amine (accelerator) was added to the other mixture, such that one part contained the peroxide initiator and the other part contained the amine accelerator.

An approximately 2.7-mm thick membrane was sprayed onto concrete at 10° C. using a two-component airless spray pump. Full surface and through cure was achieved in less than one (1) hour. After the membrane was fully cured, concrete was sprayed against the membrane. About 28 days after concrete casting, tensile adhesion between the membrane and the concrete cast thereon was tested according to ASTM $C_{1583}$ with an average value of about 0.56 MPa and standard deviation of about 0.09 MPa.

Example 4

An exemplary liquid waterproofing composition was prepared by making two separate solutions of prescribed amounts of two different methacrylate monomers—a hard monomer with $T_g$>ambient temperature, and a soft monomer with $T_g$<ambient temperature—, a liquid rubber latex (adhesion promoter), and an oligomeric dimethacrylate (with $T_g$<−20° C.), followed by dispersing prescribed amounts of a wax, fumed silica, and calcium carbonate to achieve homogeneous mixtures. Prescribed amounts of benzoyl peroxide (initiator) was added to one of the mixtures, and a tertiary amine (accelerator) was added to the other mixture, such that one part contained the peroxide initiator and the other part contained the amine accelerator.

An approximately 0.5-mm thick membrane was sprayed onto cured membrane as described in Example 3 at 10° C. using a two-component airless spray pump. Full surface and through cure was achieved in less than one (1) hour. After the membrane was fully cured, concrete was sprayed against the membrane. About 28 days after concrete casting, tensile adhesion between the membrane and the concrete cast thereon was tested according to ASTM C1583 with an average value of about 0.90 MPa and standard deviation of 0.07 MPa.

Example 5

A membrane as described in Example 3 was sprayed onto concrete. After curing, an approximately 0.1-mm thick latex coat (bond promoting composition) was sprayed onto the cured membrane. After this latex coat was fully cured, concrete was sprayed against the latex coat. In other words, a latex coat layer functions as a bond coat between the cured membrane and the concrete sprayed thereon. About 28 days after concrete casting, tensile adhesion between the membrane and the concrete cast thereon was tested according to BS EN 1542 with an average value of about 0.77 MPa and standard deviation of about 0.12 MPa.

The foregoing example and embodiments were present for illustrative purposes only and not intended to limit the scope of the invention.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for waterproofing a tunnel surface, comprising:
   (A) providing an interior substrate or surface of a tunnel;
   (B) spray-coating one or more coats of a reactive waterproofing coating composition directly or indirectly onto the tunnel interior substrate or surface, the waterproofing coating composition comprising the following components:
      (i) a first monomer comprising a di-functional (meth) acrylate in the amount of 5% to 55% based on total weight of the waterproofing coating composition, and having the structure, $(H_2C=C(R^1)COOR^2)_2-R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof, wherein the first monomer has a flash point of at least 75° C. or higher;
      (ii) a second monomer in the amount of 5% to 65% based on total weight of the waterproofing coating composition and having the structure, $H_2C=C(R^1)COOR^2$, wherein $R^1$ represents hydrogen atom or methyl group, $R^2$ represents linear or branched alkyl, hydroxyalkyl, aryl, alicyclic, polycyclic, heterocyclic, or heteroaromatic group from $C_2$ to $C_{18}$, wherein the second monomer has a flash point of at least 75° C. or higher;
      (iii) an initiator in the amount of 0.1% to 5% based on total weight of the waterproofing coating composition, wherein the initiator contacts at least one of the monomers during or immediately prior to application of the waterproofing coating composition onto the tunnel interior substrate or surface;
      (iv) an accelerator in the amount of 0.1% to 2% based on total weight of the waterproofing coating composition; and
      (v) at least one additive chosen from filler material, biocide, wax, UV absorbent, stabilizer or reaction inhibitor, pigment, rheology modifying agent, abrasion resistance enhancing additive, or a mixture thereof, the at least one additive being present in the amount 0% to 50% based on total weight of the waterproofing coating composition; and
   (C) allowing the waterproofing coating composition to polymerize in situ and to cure on the tunnel interior substrate or surface to form a waterproof layer.

2. The method of claim 1, further comprising: applying onto the waterproof layer a hydratable cementitious layer.

3. The method of claim 1 wherein
   the waterproofing coating composition further comprises a third monomer having the structure, $H_2C=C(R^1)COOR^2$, as set forth in subsection (ii) of claim 1;
   the third monomer has a glass transition temperature that is at least 30° C. lower than the glass transition temperature of the second monomer; and
   the third monomer is present in the waterproofing coating composition in the amount of 5%-60% based on total weight of the waterproofing coating composition.

4. The method of claim 1, wherein the waterproofing coating composition is spray-applied using a two-part system, wherein the first part comprises at least one of the monomers and the initiator, and the second part comprises at least one of the monomers and the accelerator.

5. The method of claim 1, wherein the first and second monomer components of the waterproofing coating composition have flash points of at least 85° C. or higher.

6. The method of claim 1, wherein, in the waterproofing coating composition, the initiator is chosen from alkyl or aryl peroxides, or inorganic salts.

7. The method of claim 1, wherein, in the waterproofing coating composition, the accelerator is chosen from an alkyl amine, aryl amine, or mixture thereof.

8. The method of claim 1, wherein, in the waterproofing coating composition, the at least two additives are chosen from a wax, rheology modifying agent, pigment, abrasion resistance-enhancing additive, or mixture thereof.

9. The method of claim 1, wherein the waterproofing coating composition further comprises an adhesion promoter in the amount of 1% to 20% based on total weight of the waterproofing coating composition.

10. The method of claim 9, wherein the adhesion promoter is chosen from acrylic, natural rubber, polyisoprene, polybutadiene, butyl rubber, styrene-butadiene rubber (SBR), styrene-acrylic rubber, ethylene-propylene-diene (EPDM) rubber, poly(vinyl acetate), and ethylene-vinyl acetate.

11. The method of claim 10, wherein the adhesion promoter is in dispersed form within a latex or aqueous suspension.

12. The method of claim 1, further comprising allowing a waterproofing coating composition to cure and applying onto the cured waterproofing coating composition a bond promoting coating composition.

13. The method of claim 12, wherein the bond promoting coating comprises one or more of a water- or solvent-based coating, a pressure sensitive adhesive, and/or a hot melt adhesive.

14. The method of claim 12, wherein the bond promoting coating comprises a latex coat.

15. The method of claim 1 wherein the waterproofing coating composition has a viscosity of less than 3 Pa·s measured using parallel plate rheometry with a 500 micron gap at $1000\ s^{-1}$ and 5° C.

16. The method of claim 1, further comprising applying a primer coating onto the tunnel interior substrate or surface, wherein the waterproofing coating composition is spray-coated onto the primer coating.

17. The method of claim 1, wherein the waterproofing coating composition, after polymerization of the monomer components on the tunnel interior substrate or surface, is cured and tack free less than 1 hour after application at 0-30° C., in accordance with ASTM D1640/D1640M-14 (2018).

18. The method of claim 17, wherein the waterproofing composition coating, after curing, has a tensile bond strength with respect to concrete sprayed or cast against it of greater than 0.3 MPa in accordance with ASTM C1583/C1583M-13 (2013).

19. A reactive composition package for establishing a waterproof coating layer on an interior substrate or surface within a tunnel, the package comprising:
   (i) a first monomer comprising a di-functional (meth) acrylate in the amount of 5% to 55% based on total weight of the waterproofing coating composition, and having the structure, $(H_2C=C(R^1)COOR^2)_2—R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane vinyl polymer, or copolymer thereof, wherein the first monomer has a flash point of at least 75° C. or higher;
   (ii) a second monomer in the amount of 5% to 65% based on total weight of the waterproofing coating composition and having the structure, $H_2C=C(R^1)COOR^2$, wherein $R^1$ represents hydrogen atom or methyl group, $R^2$ represents linear or branched alkyl, hydroxyalkyl, aryl, alicyclic, polycyclic, heterocyclic, or heteroaromatic group from $C_2$ to $C_{18}$, wherein the second monomer has a flash point of at least 75° C. or higher;
   (iii) an initiator in the amount of 0.1% to 5% based on total weight of the waterproofing coating composition;
   (iv) an accelerator in the amount of 0.1% to 2% based on total weight of the waterproofing coating composition; and
   (v) at least one additive in the amount 0% to 50% based on total weight of the waterproofing coating composition; and
     further wherein the package comprises a first part containing the initiator and the second part contains the accelerator, and the monomers and at least one additive may be contained within the first part, second part, or within both first and second parts.

20. The package of claim 19, wherein each of the first part and second part comprises the first monomer (i), the second monomer (ii), and the at least one additive, thereby enabling the first part and second part to be combined at the application jobsite in a 1:1 ratio during spray-application of the waterproofing coating composition.

21. A reactive composition for establishing a waterproofing coating composition, comprising:
   (i) a first monomer comprising a di-functional (meth) acrylate in the amount of 5% to 55% based on total weight of the waterproofing coating composition, and having the structure, $H_2C=C(R^1)COOR^2)_2—R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof, wherein the first monomer has a flash point of at least 75° C. or higher;
   (ii) a second monomer in the amount of 5% to 65% based on total weight of the waterproofing coating composition and having the structure, $H_2C=C(R^1)COOR^2$, wherein $R^1$ represents hydrogen atom or methyl group, $R^2$ represents linear or branched alkyl, hydroxyalkyl, aryl, alicyclic, polycyclic, heterocyclic, or hetero-aromatic group having from $C_2$ to $C_{18}$ groups, wherein the second monomer has a flash point of at least 75° C. or higher;
   (iii) an initiator in the amount of 0.1% to 5% based on total weight of the waterproofing coating composition;
   (iv) an accelerator in the amount of 0.1% to 2% based on total weight of the waterproofing coating composition; and
   (v) at least one additive in the amount 0% to 50% based on total weight of the waterproofing coating composition.

\* \* \* \* \*